United States Patent
Shen et al.

(10) Patent No.: US 11,108,787 B1
(45) Date of Patent: Aug. 31, 2021

(54) SECURING A NETWORK DEVICE BY FORECASTING AN ATTACK EVENT USING A RECURRENT NEURAL NETWORK

(71) Applicant: SYMANTEC CORPORATION, Mountain View, CA (US)

(72) Inventors: Yun Shen, Bristol (GB); Pierre-Antoine Vervier, Cagnes-sur-Mer (FR)

(73) Assignee: NORTONLIFELOCK INC., Tempe, AZ (US)

( * ) Notice: Subject to any disclaimer, the term of this patent is extended or adjusted under 35 U.S.C. 154(b) by 491 days.

(21) Appl. No.: 15/940,571

(22) Filed: Mar. 29, 2018

(51) Int. Cl.
*G06F 11/00* (2006.01)
*H04L 29/06* (2006.01)
*G06K 9/62* (2006.01)
*G06N 3/08* (2006.01)
*G06N 3/04* (2006.01)
*G06F 12/14* (2006.01)

(52) U.S. Cl.
CPC ........ *H04L 63/1416* (2013.01); *G06K 9/6262* (2013.01); *G06N 3/04* (2013.01); *G06N 3/08* (2013.01)

(58) Field of Classification Search
CPC ... H04L 41/0896; H04L 41/147; H04L 47/12; H04L 63/1425; H04L 63/1458; H04L 63/1416; H04L 63/1483; H04L 63/1408; H04L 63/1433; G06K 9/6262; G06N 3/04; G06N 3/08
USPC .......................................................... 726/23
See application file for complete search history.

(56) References Cited

U.S. PATENT DOCUMENTS

| 7,310,590 | B1 * | 12/2007 | Bansal | G06F 11/0715 702/181 |
| 9,112,895 | B1 * | 8/2015 | Lin | H04L 63/1425 |
| 9,516,053 | B1 * | 12/2016 | Muddu | G06N 5/04 |
| 2004/0003286 | A1 * | 1/2004 | Kaler | G06F 21/554 726/25 |

(Continued)

OTHER PUBLICATIONS

Y. Liu, A. Sarabi, J. Zhang, P. Naghizadeh, M. Karir, M. Bailey, and M. Liu, "Cloudy with a chance of breach: Forecasting cyber security incidents." 24th in USENIX Security Symposium, Aug. 12-15, 2015, Washington D.C., USA; pp. 1009-1024.

(Continued)

*Primary Examiner* — Gary S Garcia
(74) *Attorney, Agent, or Firm* — Maschoff Brennan

(57) ABSTRACT

Securing a network device by forecasting an attack event using a recurrent neural network. In one embodiment, a method may include collecting event sequences of events that occurred on multiple network devices, generating training sequences, validation sequences, and test sequences from the event sequences, training a recurrent neural network using the training sequences, the validation sequences, and the test sequences, collecting an event sequence of the most recent events that occurred on a target network device, forecasting, using the recurrent neural network and based on the event sequence of the most recent events that occurred on the target network device, the next event that will occur on the target network device, and in response to the forecasted next event being an attack event, performing a security action to prevent harm to the target network device from the attack event.

20 Claims, 4 Drawing Sheets

(56) References Cited

U.S. PATENT DOCUMENTS

| | | | | |
|---|---|---|---|---|
| 2004/0260947 | A1* | 12/2004 | Brady | H04L 63/1425 726/23 |
| 2005/0010541 | A1* | 1/2005 | Rietman | G06F 16/90 706/12 |
| 2015/0199224 | A1* | 7/2015 | Mihnev | H04L 43/08 714/37 |
| 2016/0239660 | A1* | 8/2016 | Azvine | G06F 21/55 |
| 2016/0285700 | A1* | 9/2016 | Gopalakrishnan | H04L 41/142 |
| 2017/0032243 | A1* | 2/2017 | Corrado | G06N 3/04 |
| 2017/0063887 | A1* | 3/2017 | Muddu | H04L 41/145 |
| 2017/0187747 | A1* | 6/2017 | Huston, III | H04L 63/1441 |
| 2017/0230400 | A1* | 8/2017 | Ahmed | G06N 3/086 |
| 2018/0032862 | A1* | 2/2018 | Oliner | G06N 3/0445 |
| 2018/0063168 | A1* | 3/2018 | Sofka | H04L 63/1416 |
| 2018/0174062 | A1* | 6/2018 | Simo | G06N 3/0454 |
| 2018/0183823 | A1* | 6/2018 | Fadlil | G16H 20/30 |
| 2019/0228154 | A1* | 7/2019 | Agrawal | G06N 3/08 |

OTHER PUBLICATIONS

Y. Liu, J. Zhang, A. Sarabi, M. Liu, M. Karir, and M. Bailey, "Predicting cyber security incidents using feature-based characterization of network-level malicious activities,". In Proceedings of the 2015 ACM International Workshop on International Workshop on Security and Privacy Analytics; 2015; 7 pages.

C. Sabottke, O. Suciu, and T. Dumitras, "Vulnerability disclosure in the age of social media: Exploiting twitter for predicting real-world exploits." in 24th USENIX Security Symposium, Aug. 12-15, 2015, Washington D.C., USA; pp. 1041-1056.

L. Bilge, Y. Han, and M. Dell'Amico; "RiskTeller: Predicting the Risk of Cyber Incidents"; CCS '17, Session F2, Oct. 30-Nov. 3, 2017, Dallas, TX, USA; pp. 1299-1311.

Z. Chuan, S. Shen, P. Sazena and Z. Liang; "Neural Nets Can Learn Function Type Signatures From Binaries"; in 26th USENIX Security Symposium, Aug. 16-18, 2017, Vancouver, BC, Canada; pp. 100-117.

Kwon, J., and Lee, K. M.; "A unified framework for event summarization and rare event detection"; In IEEE CVPR; 2015; pp. 1737-1750.

Melicher, W., Ur, B., Segreti, S. M., Komanduri, S., Bauer, L., Christin, N., and Cranor, L. F.; Fast, lean, and accurate: Modeling password guessability using neural networks; In USENIX Security Symposium; 2016; 71 pages.

Min Du, Feifei Li, G. Z., and Srikumar, V.; "Deeplog: Anomaly detection and diagnosis from system logs through deep learning"; In ACM CCS '17, Session F2, Oct. 30-Nov. 3, 2017, Dallas, TX, USA; pp. 1285-1298.

Pascanu, R., Stokes, J. W., Sanossian, H., Marinescu, M., and Thomas, A.; "Malware classification with recurrent networks"; In IEEE ICASSP; 2015; pp. 1916-1920.

Shin, E. C. R., Song, D., and Moazzezi, R.; "Recognizing functions in binaries with neural networks."; In 24th USENIX Security Symposium, Aug. 12-15, 2015, Washington D.C., USA; pp. 611-626.

Weiss, G. M., and Hirsh, H. Learning to predict rare events in event sequences. In 4th proceedings of International Conference on Knowledge Discovery and Data Mining; 1998; 5 pages.

Wu, J., Rehg, J. M., and Mullin, M. D.; "Learning a rare event detection cascade by direct feature selection" In NIPS; 2004; 8 pages.

Rocki, Kamil M., Recurrent Memory Array Structures, IBM Research, San Jose, 95120, USA, https://arxiv.org/abs/1607.03085v3, arXiv:1607.03085, Oct. 23, 2016.

* cited by examiner

US 11,108,787 B1

SECURING A NETWORK DEVICE BY FORECASTING AN ATTACK EVENT USING A RECURRENT NEURAL NETWORK

BACKGROUND

A network security application may monitor network devices on a network to attempt to detect whether any network device is under attack. When an attack is detected, the network security application may take steps to prevent the attack from causing harm to the network device under attack. However, when an attack is detected only after the attack is already underway, it may be too late to prevent much of the harm from the attack. Therefore, methods have been developed to attempt to forecast future attacks in order to block future attacks from harming a network device.

Unfortunately, however, conventional methods of forecasting future attacks generally require human input to guide and refine the forecasts, fail to appreciate interconnectivity between attack events in a multi-stage attack, and are unable to adequately distinguish between benign noise events and attack events. Consequently, conventional methods of forecasting future attacks are generally too labor intensive and inaccurate to be effective at preventing attacks from causing harm to a network device that is under attack.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for securing a network device by forecasting an attack event using a recurrent neural network may be performed, at least in part, by a computing device including at least one processor. The method may include collecting event sequences of events that occurred on multiple network devices, generating training sequences, validation sequences, and test sequences from the event sequences, training a recurrent neural network using the training sequences, the validation sequences, and the test sequences, collecting an event sequence of the most recent events that occurred on a target network device, using the recurrent neural network, forecasting, using the recurrent neural network and based on the event sequence of the most recent events that occurred on the target network device, the next event that will occur on the target network device, and in response to the forecasted next event being an attack event, performing a security action to prevent harm to the target network device from the attack event.

In some embodiments, the recurrent neural network may be a Long Short-Term Memory (LSTM) Memory Array (MA) recurrent neural network.

Also, in some embodiments, the method further includes empirically identifying a fixed input sequence length, and the length of each of the training sequences, the validation sequences, and the test sequences may be equal to the fixed input sequence length. In these embodiments, the method may further include periodically updating the fixed input sequence length. In some embodiments, the event sequence of the most recent events that occurred on the target network device may have a variable length.

Further, in some embodiments, each of the training sequences, the validation sequences, and the test sequences may include a label that corresponds to the next event in the corresponding sequence.

Also, in some embodiments, the collecting of the event sequences of events that occurred on the multiple network devices may be performed periodically at a regular interval. In these embodiments, the regular interval may be daily.

Further, in some embodiments, the forecasting may include the recurrent neural network distinguishing between attack events and noise events in the event sequence of the most recent events that occurred on the target network device. In these embodiments, the forecasting may include ignoring the noise events and using the attack events to forecast the next event that will occur on the target network device.

Also, in some embodiments, one or more non-transitory computer-readable media may include one or more computer-readable instructions that, when executed by one or more processors, cause the one or more processors to perform a method for securing a network device by forecasting an attack event using a recurrent neural network.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Conventional methods of forecasting future attacks generally require human input to guide and refine the forecasts, fail to appreciate interconnectivity between attack events in a multi-stage attack, and are unable to adequately distinguish between benign noise and attacks. Consequently, conventional methods of forecasting future attacks are generally too labor intensive and inaccurate to be effective at preventing attacks from causing harm to a network device that is under attack.

The embodiments disclosed herein may enable the securing of a network device by forecasting an attack event using a recurrent neural network. In some embodiments, securing a target network device may include training a recurrent neural network, collecting an event sequence of the most recent events that occurred on a target network device, using the recurrent neural network to forecast the next event that will occur on the target network device, and in response to the forecasted next event being an attack event, performing a security action to prevent harm to the target network device from the attack event. Unlike conventional methods of forecasting future attacks, some embodiments disclosed herein are able to accurately forecast attack events without human involvement, are able to appreciate interconnectivity between attack events in a multi-stage attack, and are able to distinguish between benign noise events and malicious attack events, thus automatically and accurately forecasting and preventing attacks from causing harm to a network device that is under attack.

Figure 1:
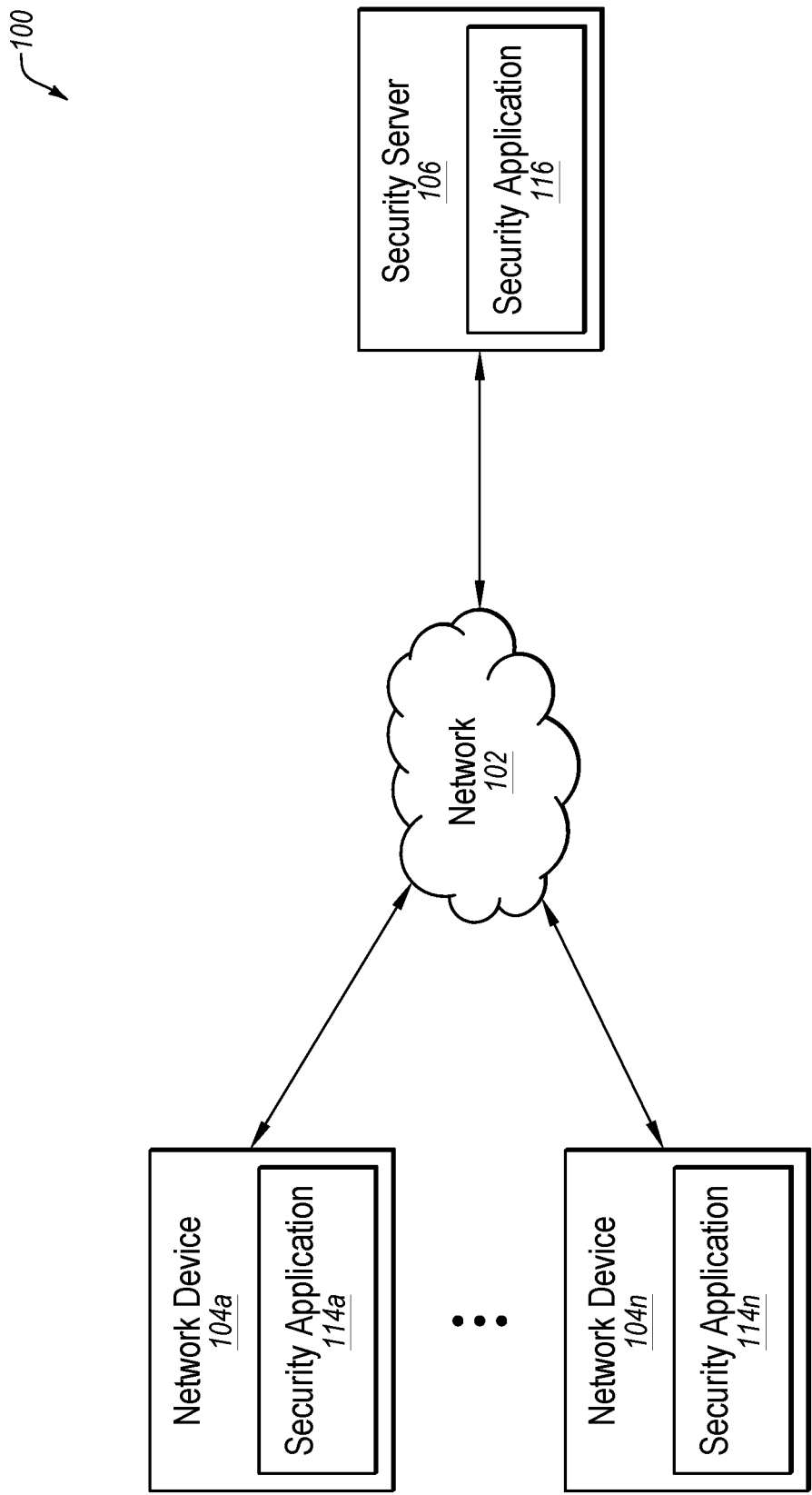
FIG. 1 illustrates an example system configured for securing a network device by forecasting an attack event using a recurrent neural network.

Turning to the figures, FIG. 1 illustrates an example system 100 configured for securing a network device by forecasting an attack event using a recurrent neural network. The system 100 may include a network 102, network devices 104a-104n, and a security server 106.

In some embodiments, the network 102 may be configured to communicatively couple the network devices 104a-104n to one another as well as to the security server 106. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 3:
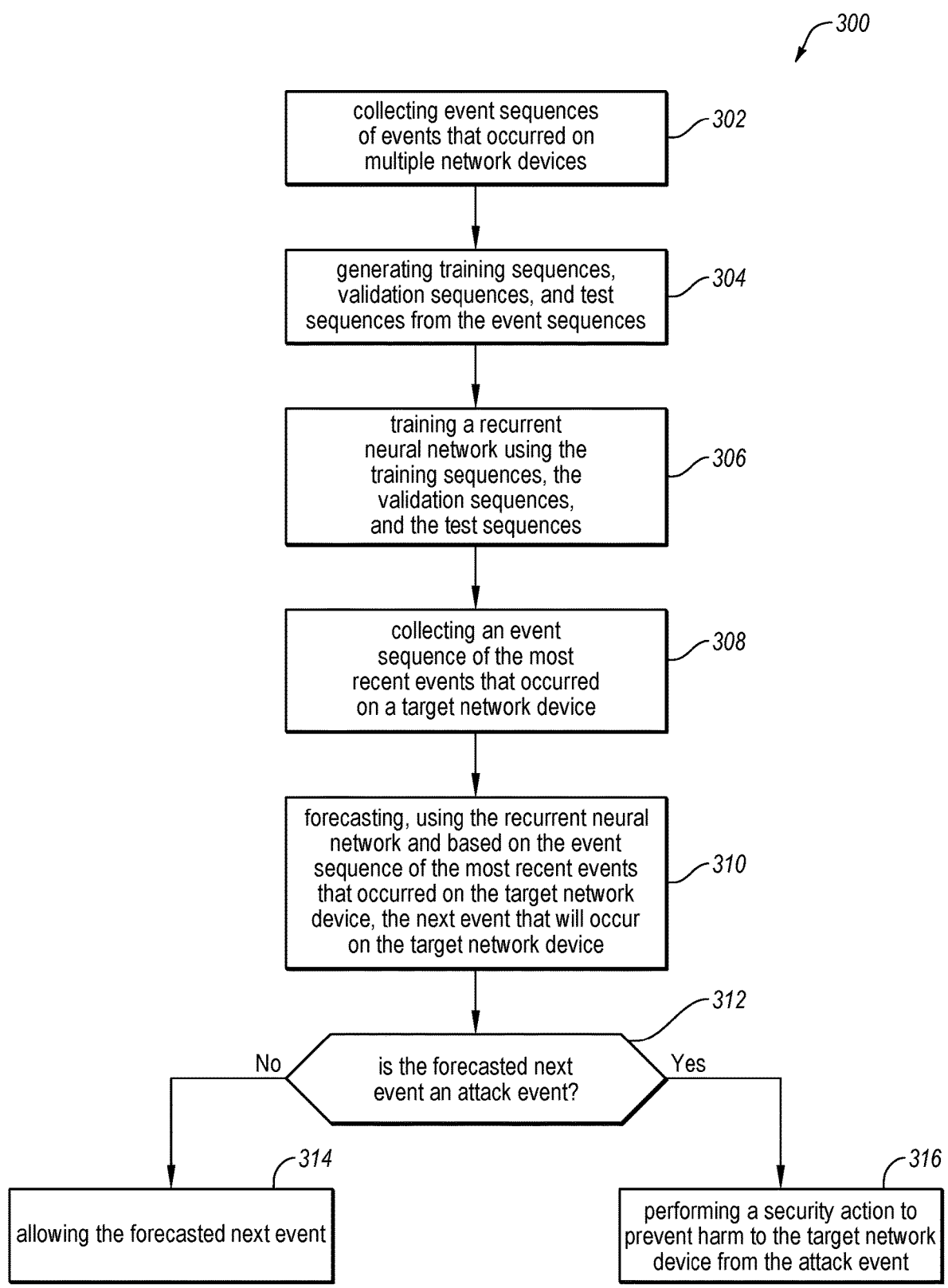
FIG. 3 is a flowchart of an example method for securing a network device by forecasting an attack event using a recurrent neural network.
Figure 4:
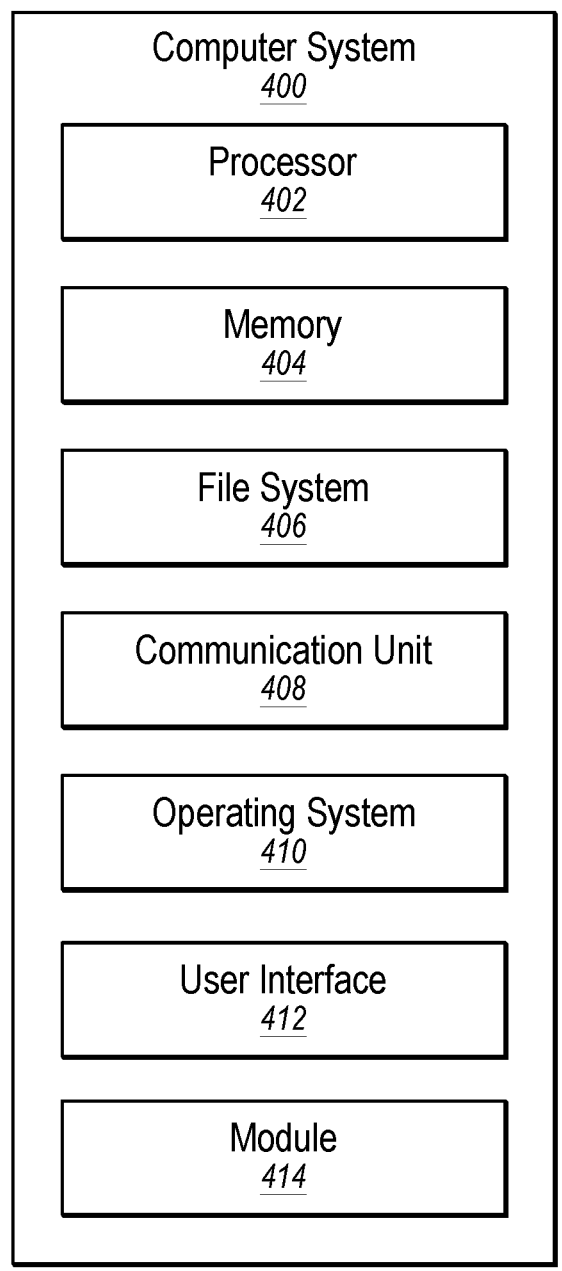
FIG. 4 illustrates an example computer system that may be employed in securing a network device by forecasting an attack event using a recurrent neural network.

In some embodiments, each of the network devices 104a-104n may be any computer system capable of communicating over the network 102, examples of which are disclosed herein in connection with the computer system 400 of FIG. 4. In some embodiments, the network devices 104a-104n may include security applications 114a-114n, respectively. Similarly, in some embodiments, the security server 106 may be any computer system capable of communicating over the network 102 and capable of monitoring the network devices 104a-104n, examples of which are disclosed herein in connection with the computer system 400 of FIG. 4. In some embodiments, the security server 106 may include a security application 116 that may be configured to secure the network 102 and/or any of the network devices 104a-104n in the network 102, and may be configured to function in connection with the security application 114a-114n, as disclosed in greater detail in connection with FIGS. 2 and 3 herein. In some embodiments, any of the security applications 114a-114n and the security application 116 may include, or be part of, Symantec Corporation's Norton Internet Security applications.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2:
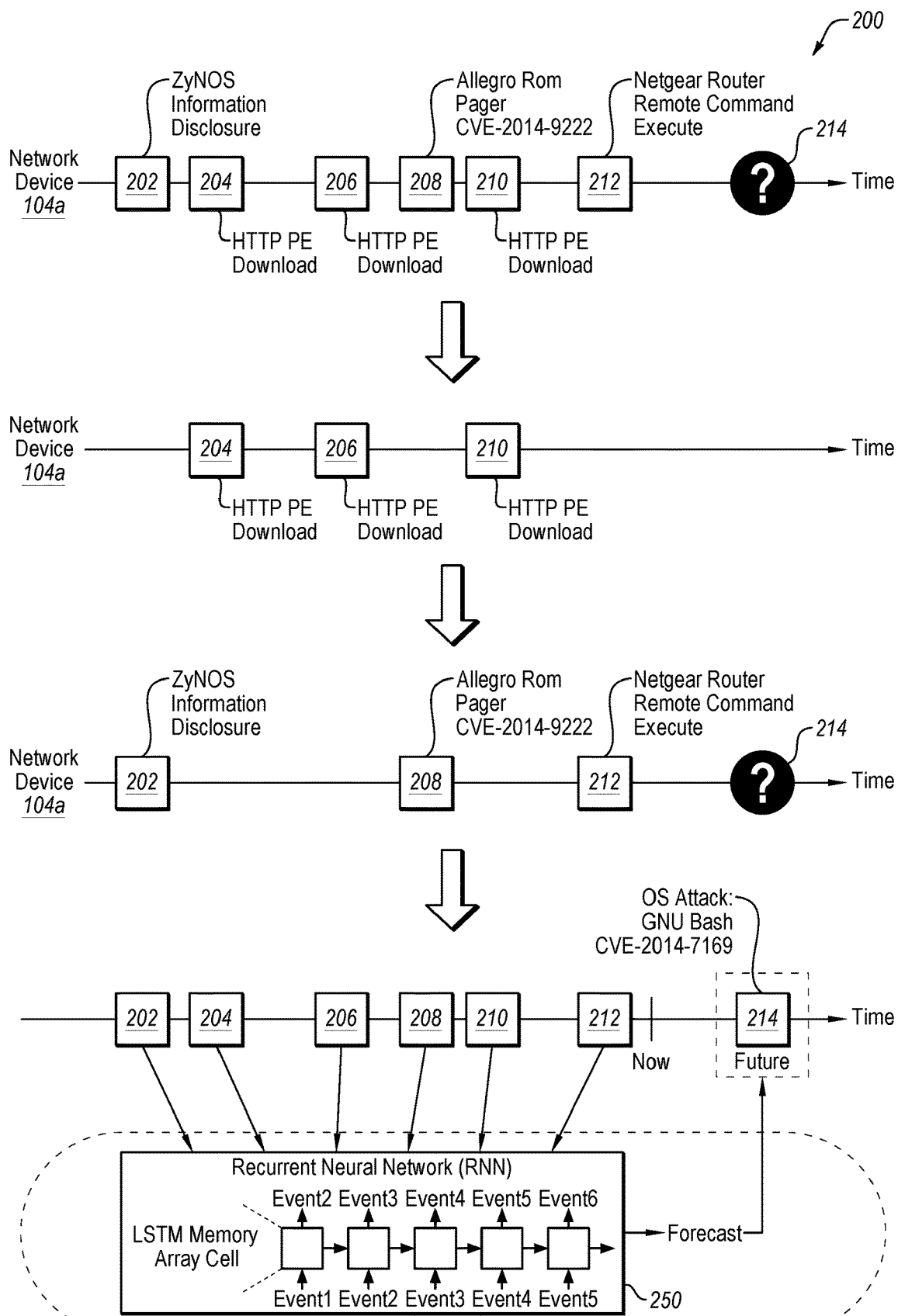
FIG. 2 is a flowchart of an example event sequence and an example recurrent neural network.

FIG. 2 is a flowchart of an example event sequence 200 and an example recurrent neural network 250. As disclosed in FIGS. 1 and 2, and prior to the occurrence of the events of the event sequence 200 in FIG. 2, the security application 114a and/or the security application 116 may monitor the network devices 104a-104n to collect event sequences that occur on the network devices 104a-104n. Each of the events in the event sequences may be classified by the type of the event. For example, this classification may involve determining that the signature of each event matches one of Symantec Corporation's Intrusion Prevention System (IPS) Ping signatures, and the IPS Ping signature can then be used to classify each event in the event sequences. The security application 114a and/or the security application 116 may collect these event sequences periodically, such as hourly, daily, weekly, or monthly. Then, the security application 114a and/or the security application 116 may generate training sequences, validation sequences, and test sequences from the event sequences and train the recurrent neural network 250 using the training sequences, the validation sequences, and the test sequences. This training may enable the recurrent neural network 250 to understand both long-term and short-term interaction between events, and the effects between benign noise events and malicious attack events.

As disclosed in FIGS. 1 and 2, the security application 114a and/or the security application 116 may then collect the event sequence 200 of the most recent events that occurred on the network device 104a, which includes six (6) events, namely, events 202-212. The events 202-212 of the event sequence 200 may include benign noise events 220, which include events 204, 206, and 210, and malicious attack events 230, which include events 202, 208, and 212. The security application 114a and/or the security application 116 may then feed the events 202-212 of the event sequence 200 into the recurrent neural network 250 in order for the recurrent neural network 250 to forecast the next event 214 that will occur on the network device 104a. For example, as disclosed in FIG. 2, the benign noise events 220, which include events 204, 206, and 210, and the malicious attack events 230, which include events 202, 208, and 212, may be fed as input into the recurrent neural network 250 in order for the recurrent neural network 250 to forecast the next event 214 that will occur on the network device 104a. The recurrent neural network 250 may then be capable of distinguishing between the malicious attack events 230 and the benign noise events 220 in the event sequence 200 in order to ignore the benign noise events 220 and in order to use the malicious attack events 230 to forecast the next event 214 that will occur on the network device 104a.

Then, in response to the forecasted next event 214 being an attack event, the security application 114a and/or the security application 116 may perform a security action to prevent harm to the network device 104a from the forecasted attack event 214. For example, where the forecasted attack event 214 includes connecting the network device 104a to a malicious website, the security action may instead include redirecting the network device 104a to a safe website. In another example, where the forecasted attack event 214 includes sending sensitive and unauthorized data from the network device 104a over the network 102 to an unsecure device, the security action may include blocking the network device 104a from sending data over the network 102. In another example, where the forecasted attack event 214 includes executing a malicious application on the network device 104a, the security action may include removing the malicious application from the network device 104a or quarantining the malicious application on the network device 104a.

Therefore, unlike conventional methods of forecasting future attacks, a method that involves the use of the recurrent neural network 250 of FIG. 2 is able to accurately forecast attack events without human involvement, is able to appreciate interconnectivity between attack events in a multi-stage attack, and is able to distinguish between the benign noise events 220 and the malicious attack events 230. Thus, the recurrent neural network 250 is able to automatically and accurately forecast and prevent attacks from causing harm to the network device 104a that is under attack.

Modifications, additions, or omissions may be made to the flowchart of FIG. 2 without departing from the scope of the present disclosure. For example, in some embodiments, the event sequence 200 may include greater than or less than six (6) events.

FIG. 3 is a flowchart of an example method for securing a network device by forecasting an attack event using a recurrent neural network. The method 300 may be performed, in some embodiments, by a system or device or application, such as by the security application 114a and/or the security application 116 of FIG. 1. In these and other embodiments, the method 300 may be performed by one or more processors based on one or more computer-readable instructions stored on one or more non-transitory computer-readable media. The method 300 will now be described in connection with FIGS. 1, 2, and 3.

The method 300 may include, at action 302, collecting event sequences of events that occurred on multiple network devices. In some embodiments, the collecting of the event sequences of events that occurred on the multiple network devices may be performed periodically at a regular interval. In these embodiments, the regular interval may be daily. For example, the security applications 114a-114n and/or the security application 116 may daily collect, at action 302, event sequences of events that occurred on the network devices 104a-104n.

The method 300 may include, at action 304, generating training sequences, validation sequences, and test sequences from the event sequences. In some embodiments, the method further includes empirically identifying a fixed input sequence length, and the length of each of the training sequences, the validation sequences, and the test sequences may be equal to the fixed input sequence length. In these embodiments, the method may further include periodically updating the fixed input sequence length. Further, in some embodiments, each of the training sequences, the validation sequences, and the test sequences may include a label that corresponds to the next event in the corresponding sequence. For example, the security applications 114a-114n and/or the security application 116 may generate, at action 304, training sequences, validation sequences, and test sequences from the event sequences that were collected at action 302. In this example, the security applications 114a-114n and/or the security application 116 may also empirically identify a hyper parameter "W", which is a fixed input sequence length of events, such as six (6) events, for example, and the length of each of the training sequences, the validation sequences, and the test sequences may be equal to the hyper parameter "W", which is a fixed input sequence length of six (6) events. Further, in this example, each of the training sequences, the validation sequences, and the test sequences may include a label that corresponds to the next event in the corresponding sequence. For example, if an event sequence includes events "[1,2,3,4,5,6,7,8]", and "W" is fixed to "6", two sequences may be generated, namely, a first sequence "[1,2,3,4,5,6]" with a label of "7" indicating that the event following the first sequence is event "7", as well as a second sequence "[2,3,4,5,6,7]" with a label of "8" indicating that the event following the second sequence is event "8". Then, once the sequences are generated, they may be split into training sequences "T", validation sequences "V", and test sequences "S". In some embodiments, validation sequences "V" may be used to tune other hyper-parameters (e.g., dropout, etc.).

The method 300 may include, at action 306, training a recurrent neural network using the training sequences, the validation sequences, and the test sequences. In some embodiments, the recurrent neural network may be a Long Short-Term Memory (LSTM) Memory Array (MA) recurrent neural network. For example, the security applications 114a-114n and/or the security application 116 may train, at action 306, the recurrent neural network 250, which may be an LSTM MA recurrent neural network, using the training sequences, the validation sequences, and the test sequences that were generated at action 304. An LSTM MA recurrent neural network may be employed in order to resolve a long-term dependency problem due to the default ability of an LSTM MA recurrent neural network to remember information for a relatively long period of time. During the training of the LSTM MA recurrent neural network, the following six (6) equations may be optimized using gated recurrent units (GRUs) of the LSTM MA recurrent neural network:

$$f_k^t = \sigma(W_{fk}x^t + U_{fk}h^{t-1} + b_{fk})$$

$$i_k^t = \sigma(W_{ik}x^t + U_{ik}h^{t-1} + b_{ik})$$

$$o_k^t = \sigma(W_{ok}x^t + U_{ok}h^{t-1} + b_{ok})$$

$$c_k^{-t} = \tanh(W_{ck}x^t + U_{ck}h^{t-1} + b_{ck})$$

$$c_k^t = f_k^t \odot c_k^{t-1} + i_k^t \odot c_k^{-t}$$

$$h^t = \sum_k o_k^t \odot \tanh(c_k^t)$$

After iteratively updating the above six (6) equations, a hidden state (h) of the LSTM MA recurrent neural network may be able to capture the implicit dependency among events.

The method 300 may include, at action 308, collecting an event sequence of the most recent events that occurred on a target network device. In some embodiments, the event sequence of the most recent events that occurred on the target network device may have a variable length. For example, the security application 114a and/or the security application 116 may collect, at action 308, the event sequence 200 of the six (6) most recent events 202-212 that occurred on the network device 104a. In this example, instead of six (6) events, the event sequence 200 may have a variable length of greater than or less than six (6) events.

The method 300 may include, at action 310, forecasting, using the recurrent neural network and based on the event sequence of the most recent events that occurred on the target network device, the next event that will occur on the target network device. Further, in some embodiments, the forecasting at action 310 may include the recurrent neural network distinguishing between attack events and noise events in the event sequence of the most recent events that occurred on the target network device. In these embodiments, the forecasting at action 310 may include ignoring the noise events and using the attack events to forecast the next event that will occur on the target network device. For example, the security application 114a and/or the security application 116 may forecast, at action 310, the next event 214 that will occur on the network device 104a using the recurrent neural network 250 and based on the event sequence 200 of the six (6) most recent events 204-212 that occurred on the network device 104a. In this example, the forecasting at action 310 may include the recurrent neural network 250 distinguishing between the malicious attack events 230 and the benign noise events 220 in the event sequence 200 of the most recent events that occurred on the network device 104a, and the recurrent neural network 250 may ignore the benign noise events 220 and use the malicious attack events 230 to forecast the next event 214 that will occur on the network device 104a. In some embodiments, the output of the action 310 may be a list of events with probabilistic scores, and the event with the highest probabilistic score may be chosen as the forecasted next event.

The method 300 may include, at action 312, determining whether the forecasted next event is an attack event. If not (No at action 312), the method 300 may proceed to action 314. If so (Yes at action 312), the method 300 may proceed to action 316. For example, the security application 114a and/or the security application 116 may determine, at action 312, whether the forecasted next event 214 is an attack event. If not, the security application 114a and/or the security application 116 may proceed to action 314. If so, the security application 114a and/or the security application 116 may proceed to action 316.

The method 300 may include, at action 314, allowing the forecasted next event. For example, the security application 114a and/or the security application 116 may allow, at action 314, the forecasted next event 214 where the forecasted next event 214 was determined at action 312 to not be a malicious attack event but rather was determined to be a benign noise event.

The method 300 may include, at action 316, performing a security action to prevent harm to the target network device from the attack event. For example, the security application 114a and/or the security application 116 may perform, at action 316, on the network device 104a where the forecasted next event 214 was determined at action 312 to be a malicious attack event. The security action may prevent harm to the network device 104a from the malicious attack event 214.

The method 300 may thus be employed, in some embodiments, to securing the network device 104a by forecasting the attack event 214 using the recurrent neural network 250. Unlike conventional methods of forecasting future attacks, the recurrent neural network 250 employed in the method 300 is able to accurately forecast attack events without human involvement, is able to appreciate interconnectivity between attack events in a multi-stage attack, and is able to distinguish between the benign noise events 220 and the malicious attack events 230. Thus, the recurrent neural network 250 employed in the method 300 is able to automatically and accurately forecast and prevent attacks from causing harm to the network device 104a that is under attack.

Although the actions of the method 300 are illustrated in FIG. 3 as discrete actions, various actions may be divided into additional actions, combined into fewer actions, reordered, expanded, or eliminated, depending on the desired implementation. For example, in some embodiments, actions 308 and 310 may be performed separately from the other actions of the method 300. Also, in some embodiments, actions 302-310 may be performed without performing the other actions of the method 300. Also, in some embodiments, action 312 or action 314 may be eliminated or may be performed by a network administrator or other entity that is different from the entity performing the other actions of the method 300.

Further, it is understood that the method 300 may improve the functioning of a computer system itself. For example, the functioning of network device 104a and/or the security server 106 may itself be improved by the method 300. For example, the network device 104a may itself be improved by the method 300 forecasting that the next event on the network device 104a will be a particular type of attack event and then performing a security action to prevent harm to the network device 104a from the particular type of attack event. In another example, the security server 106 may itself be improved by the method 300 employing the recurrent neural network 250 to accurately forecast attack events without human involvement, to appreciate interconnectivity between attack events in a multi-stage attack, and to prevent attacks from causing harm to the network device 104a that is under attack.

Also, the method 300 may improve the technical field of forecasting future attacks. In particular, the method 300 is able to forecast the next attack event for a particular computer and thus perform a security action that is directed to the particular forecasted next event in order to prevent the forecasted next event from causing harm to the network device 104a that is under attack. Further, the method 300 is able to do so accurately without human involvement and while appreciating interconnectivity between attack events in a multi-stage attack, unlike conventional methods of forecasting future attacks which generally require human input to guide and refine the forecasts, fail to appreciate interconnectivity between attack events in a multi-stage attack, are unable to adequately distinguish between benign noise events and malicious attack events, and are generally too labor intensive and inaccurate to be effective at preventing attacks from causing harm to a network device under attack.

FIG. 4 illustrates an example computer system 400 that may be employed in securing a network device by forecasting an attack event using a recurrent neural network. In some embodiments, the computer system 400 may be part of any of the systems or devices described in this disclosure. For example, the computer system 400 may be part of any of the network devices 104a-104n and the security server 106 of FIG. 1.

The computer system 400 may include a processor 402, a memory 404, a file system 406, a communication unit 408, an operating system 410, a user interface 412, and a module 414, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the method 300 of FIG. 3.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the method 300 of FIG. 3. These computer-executable instructions may be included, for example, in the operating system 410, in one or more applications, such as the security applications 114a-114n and/or the security application 116, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The module 414 may be one or more computer-readable instructions stored on one or more non-transitory computer-readable media, such as the memory 404 or the file system 406, that, when executed by the processor 402, is configured to perform one or more of the actions of the method 300 of FIG. 3. In some embodiments, the module 414 may be part of the operating system 410 or may be part of an application of the computer system 400, or may be some combination thereof. In some embodiments, the module 414 may function as any one of the security applications 114a-114n and the security application 116.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software modules, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for securing a network device by forecasting an attack event using a recurrent neural network of a security server, at least a portion of the method being performed by a computing device comprising at least one processor, the method comprising:
   collecting, by the security server, event sequences of events that occurred on multiple network devices, the events in the event sequences including benign noise events and attack events;
   generating, by the security server, training sequences, validation sequences, and test sequences from the event sequences;
   training, by the security server, the recurrent neural network of the security server using the training sequences, the validation sequences, and the test sequences, the recurrent neural network being capable of capturing an implicit dependency among the events;
   collecting an event sequence of the most recent events that occurred on a target network device;
   automatically forecasting, using the recurrent neural network and based on the event sequence of the most recent events that occurred on the target network device, the very next event that will occur in the future in the event sequence on the target network device, regardless of an event type of whether the forecasted very next event is forecasted to be a future attack event or a future benign noise event; and
   in response to the forecasted very next event that will occur in the future being forecasted to be a future attack event, performing a security action to prevent harm to the target network device from the future attack event.

2. The method of claim 1, wherein the recurrent neural network is a Long Short-Term Memory (LSTM) Memory Array (MA) recurrent neural network.

3. The method of claim 1, wherein:
   the method further comprises empirically identifying a fixed input sequence length;
   the length of each of the training sequences, the validation sequences, and the test sequences is equal to the fixed input sequence length; and
   the generating of the training sequences, the validation sequences, and the test sequences from the event sequences includes splitting event sequences that are longer than the fixed input sequence length into multiple training sequences, validation sequences, or test sequences, or some combination thereof.

4. The method of claim 3, further comprising periodically updating the fixed input sequence length.

5. The method of claim 1, wherein the event sequence of the most recent events that occurred on the target network device has a variable length.

6. The method of claim 1, wherein each of the training sequences, the validation sequences, and the test sequences includes a label that corresponds to the next event in the corresponding sequence.

7. The method of claim 1, wherein the collecting of the event sequences of events that occurred on the multiple network devices is performed periodically at a regular interval.

8. The method of claim 7, wherein the regular interval is daily.

9. The method of claim 1, wherein the forecasting includes the recurrent neural network distinguishing between attack events and benign noise events in the event sequence of the most recent events that occurred on the target network device.

10. The method of claim 9, wherein the forecasting includes ignoring the noise events and using the attack events to forecast the very next event that will occur in the future in the event sequence on the target network device.

11. One or more non-transitory computer-readable media comprising one or more computer-readable instructions that, when executed by one or more processors of one or more computing devices, cause the one or more computing devices to perform a method for securing a network device by forecasting an attack event using a recurrent neural network of a security server, the method comprising:

collecting, by the security server, event sequences of events that occurred on multiple network devices, the events in the event sequences including benign noise events and attack events;

generating, by the security server, training sequences, validation sequences, and test sequences from the event sequences;

training, by the security server, the recurrent neural network of the security server using the training sequences, the validation sequences, and the test sequences, the recurrent neural network being capable of capturing an implicit dependency among the events;

collecting an event sequence of the most recent events that occurred on a target network device;

automatically forecasting, using the recurrent neural network and based on the event sequence of the most recent events that occurred on the target network device, the very next event that will occur in the future in the event sequence on the target network device, regardless of an event type of whether the forecasted very next event is forecasted to be a future attack event or a future benign noise event; and in response to the forecasted very next event that will occur in the future being forecasted to be a future attack event, performing a security action to prevent harm to the target network device from the future attack event.

12. The one or more non-transitory computer-readable media of claim 11, wherein the recurrent neural network is a Long Short-Term Memory (LSTM) Memory Array (MA) recurrent neural network.

13. The one or more non-transitory computer-readable media of claim 11, wherein:

the method further comprises empirically identifying a fixed input sequence length; and the length of each of the training sequences, the validation sequences, and the test sequences is equal to the fixed input sequence length; and the generating of the training sequences, the validation sequences, and the test sequences from the event sequences includes splitting event sequences that are longer than the fixed input sequence length into multiple training sequences, validation sequences, or test sequences, or some combination thereof.

14. The one or more non-transitory computer-readable media of claim 13, further comprising periodically updating the fixed input sequence length.

15. The one or more non-transitory computer-readable media of claim 11, wherein the event sequence of the most recent events that occurred on the target network device has a variable length.

16. The one or more non-transitory computer-readable media of claim 11, wherein each of the training sequences, the validation sequences, and the test sequences includes a label that corresponds to the next event in the corresponding sequence.

17. The one or more non-transitory computer-readable media of claim 11, wherein the collecting of the event sequences of events that occurred on the multiple network devices is performed periodically at a regular interval.

18. The one or more non-transitory computer-readable media of claim 17, wherein the regular interval is daily.

19. The one or more non-transitory computer-readable media of claim 11, wherein the forecasting includes the recurrent neural network distinguishing between attack events and benign noise events in the event sequence of the most recent events that occurred on the target network device.

20. The one or more non-transitory computer-readable media of claim 19, wherein the forecasting includes ignoring the noise events and using the attack events to forecast the very next event that will occur in the future in the event sequence on the target network device.

* * * * *